US009003309B1

(12) United States Patent
Venkateshamurthy

(10) Patent No.: US 9,003,309 B1
(45) Date of Patent: Apr. 7, 2015

(54) METHOD AND APPARATUS FOR CUSTOMIZING CONTENT DISPLAYED ON A DISPLAY DEVICE

(75) Inventor: Shivakumara Venkateshamurthy, Karnataka (IN)

(73) Assignee: Adobe Systems Incorporated, San Jose, CA (US)

( * ) Notice: Subject to any disclaimer, the term of this patent is extended or adjusted under 35 U.S.C. 154(b) by 714 days.

(21) Appl. No.: 12/657,514

(22) Filed: Jan. 22, 2010

(51) Int. Cl.
| G06F 17/00 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 3/00 | (2006.01) |
| G06F 3/048 | (2013.01) |
| G06F 3/14 | (2006.01) |
| G06F 17/30 | (2006.01) |

(52) U.S. Cl.
CPC ...... G06F 17/2247 (2013.01); G06F 17/30905 (2013.01)

(58) Field of Classification Search
CPC . G06F 17/211; G06F 17/2247; G06F 17/248; G06F 17/20905; G06F 3/0481
USPC ......... 715/204, 234–236, 238, 239, 242, 243, 715/248, 249, 251, 252, 760, 764, 799, 800, 715/864, 866
See application file for complete search history.

(56) References Cited

U.S. PATENT DOCUMENTS

| 7,016,963 | B1 * | 3/2006 | Judd et al. ...................... 709/228 |
| 7,219,309 | B2 | 5/2007 | Kaasila |
| 2002/0095441 | A1 * | 7/2002 | Lakhani et al. ................ 707/513 |
| 2002/0178222 | A1 * | 11/2002 | O'Hara et al. ................. 709/205 |
| 2003/0083960 | A1 * | 5/2003 | Dweck .............................. 705/27 |
| 2003/0110234 | A1 * | 6/2003 | Egli et al. ....................... 709/217 |
| 2003/0120599 | A1 * | 6/2003 | Agboatwalla et al. ........... 705/50 |
| 2003/0177269 | A1 * | 9/2003 | Robinson et al. ............. 709/246 |
| 2004/0103371 | A1 * | 5/2004 | Chen et al. .................... 715/513 |
| 2004/0133848 | A1 * | 7/2004 | Hunt et al. .................... 715/500 |
| 2004/0205452 | A1 * | 10/2004 | Fitzsimons et al. ........... 715/500 |
| 2004/0205732 | A1 * | 10/2004 | Parkinson ..................... 717/137 |
| 2005/0132014 | A1 * | 6/2005 | Horvitz et al. ................ 709/206 |
| 2005/0289401 | A1 * | 12/2005 | Goin et al. ....................... 714/47 |
| 2006/0047793 | A1 * | 3/2006 | Agrawal et al. ............... 709/221 |
| 2006/0230030 | A1 * | 10/2006 | Volpa et al. ....................... 707/3 |

(Continued)

OTHER PUBLICATIONS

Rechert, Klaus, "Video and Audio Streaming with Flash and Open Source Tools," retrieved from http://klaus.geekserver.net/flash/streaming.html, retrieved on Jun. 12, 2012.*

Primary Examiner — Eric J Bycer
(74) Attorney, Agent, or Firm — Keller Jolley Preece

(57) ABSTRACT

A computer implemented method and apparatus for customizing web page display by receiving a web page comprising content for display upon a display device and receiving a transformation file comprising information associated with transforming an object within the content with regard to at least one of position, scale or rotation. Based upon the information in the transformation file, the object is transformed with regard to at least one of position, scale or rotation, while not transforming content that is not part of the object. The web page is displayed having the object transformed in accordance with the transformation file.

20 Claims, 8 Drawing Sheets

(56) References Cited

U.S. PATENT DOCUMENTS

| | | |
|---|---|---|
| 2006/0288278 A1* | 12/2006 | Kobayashi .................... 715/523 |
| 2006/0288280 A1* | 12/2006 | Makela ......................... 715/530 |
| 2007/0061243 A1* | 3/2007 | Ramer et al. .................... 705/37 |
| 2007/0130525 A1* | 6/2007 | Murphy et al. ............... 715/747 |
| 2007/0204220 A1* | 8/2007 | Petrov Nickolov et al. .. 715/530 |
| 2007/0263007 A1* | 11/2007 | Robotham et al. ............ 345/581 |
| 2008/0051076 A1* | 2/2008 | O'Shaughnessy et al. ... 455/419 |
| 2008/0270890 A1* | 10/2008 | Stern ............................. 715/239 |
| 2009/0109243 A1* | 4/2009 | Kraft et al. .................... 345/660 |
| 2009/0125802 A1* | 5/2009 | Chen et al. .................... 715/234 |
| 2009/0305682 A1* | 12/2009 | Spalink ...................... 455/414.3 |
| 2010/0017464 A1* | 1/2010 | Cheng et al. .................. 709/203 |
| 2011/0066971 A1* | 3/2011 | Forutanpour et al. ........ 715/788 |

* cited by examiner

METHOD AND APPARATUS FOR CUSTOMIZING CONTENT DISPLAYED ON A DISPLAY DEVICE

BACKGROUND

1. Field

Embodiments described herein generally relate to web page content management and, more particularly, relate to a method and apparatus for customizing content displayed on a display device.

2. Description of the Related Art

Rapid proliferation of content available via the Internet has resulted in widespread use of the Internet. Internet users spend a significant amount of time browsing the Internet to conduct research (e.g., through educational websites, digital libraries and expert discussion forums), execute and download applications, as well as to communicate with other users (e.g., through instant messages, social networking and emails). Such an increase in Internet use has led more and more users to access Internet resources (e.g. web pages, multimedia clips, emails and/or the like) on mobile display devices (e.g., mobile phones, Personal Digital Assistants (PDA), hand-held gaming devices, digital reading devices, and/or the like).

Generally, a mobile display device has a small display screen as well as limited computer processing capability. Additionally, content from various Internet resources is intended to be displayed primarily on a desk top computer, i.e., a large screen. As a result of these limitations, when viewing a web page on a mobile display device only a small portion of the content is visible to a user of the display device. The user must scroll in one or more directions to view specific content within a page. Further, the display devices, because of limited processing resources, may be unable to process and view all the content on a given page. Thus, a user must wait for portions of a page to be rendered in a piece-wise fashion.

Currently, various techniques are available to improve the display of content on a mobile display device. One technique allows the user to "zoom" the content of a web page, i.e., fill the screen with a display of specific regions of content within a web page. According to another technique, the user may select "full screen mode" and provision specific content to fit on the display screen, e.g., select "full screen" for a specific video window within a web page, However, such techniques require substantial content manipulation by the user to achieve a desired viewing experience. Furthermore, when the user returns to the web page, the entire content manipulation process must be repeated to achieve the same viewing experience.

Therefore, there is a need in the art for an improved method and apparatus for customizing content displayed on a display device having a limited screen size and/or limited computer processing capability.

SUMMARY

A method and apparatus for customizing content displayed on a display device are described. In one embodiment, a computer implemented method receives a web page comprising content for display upon a display device and receives a transformation file comprising information associated with transforming an object within the content with regard to at least one of position, scale or rotation. Based upon the information in the transformation file, the object is transformed with regard to at least one of position, scale or rotation, while not transforming content that is not part of the object. The web page is displayed having the object transformed in accordance with the transformation file.

Figure 1:
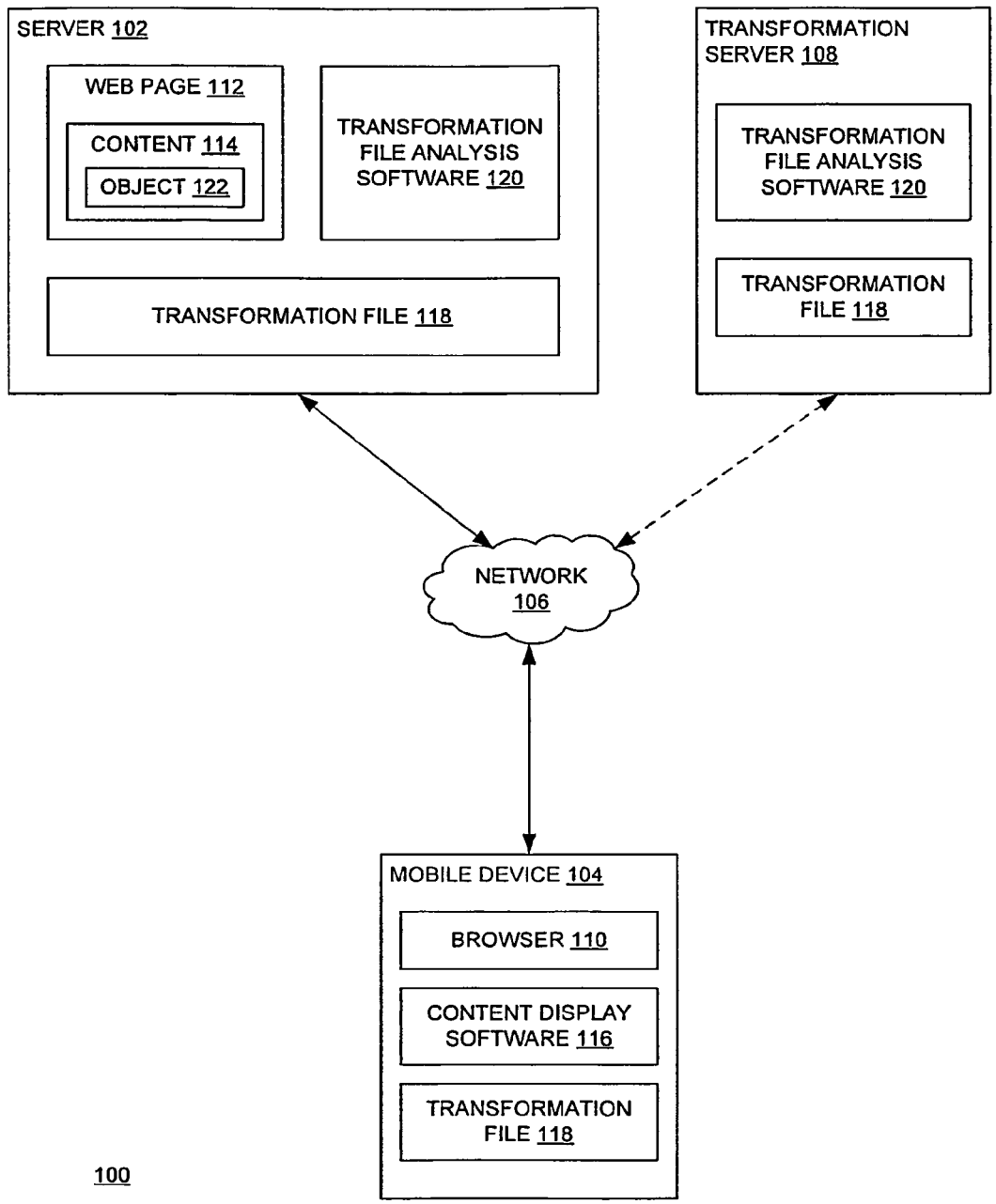
FIG. 1 is a block diagram of a system for customizing content for display on a display device, according to one or more embodiments.

While the system and method for customizing content displayed on a display device is described herein by way of example for several embodiments and illustrative drawings, those skilled in the art will recognize that the system and method for provisioning of content on a display device is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for customizing content displayed on a display device as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for customizing content displayed on a display device are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for customizing content displayed on a display device according to one embodiment. The system 100 includes a server 102, a display device 104 and an optional transformation server 108, each coupled to one another through a network 106.

Figure 10:
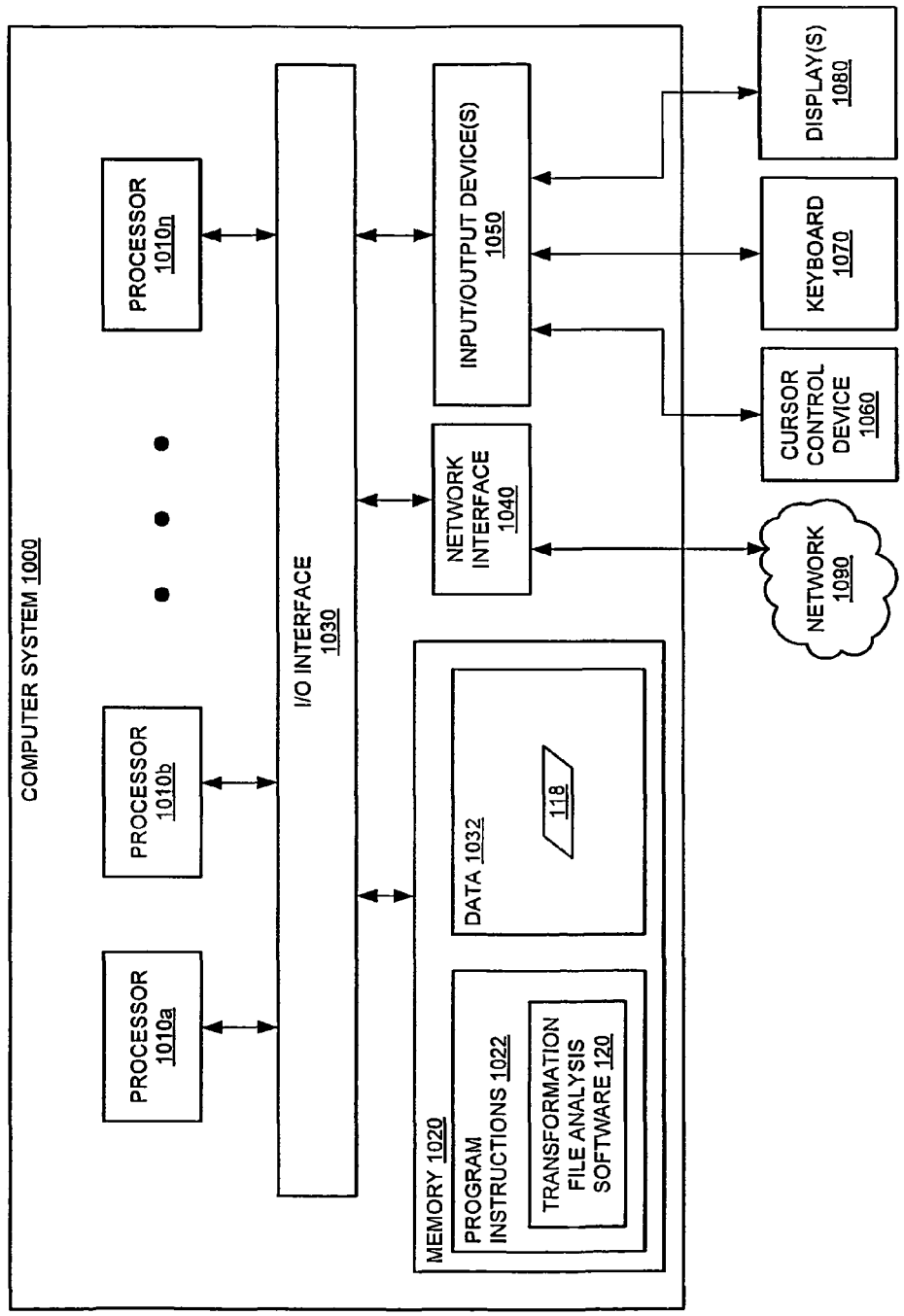
FIG. 10 is a block diagram of a computer server, according to one or more embodiments.

The server 102 is a type of computing device for providing files, web pages and applications to other computers via a network. FIG. 10 and its descriptive text describe details of the server hardware. In one embodiment, the server 102 may be a web server that provides various web-based services. This server may also be a proxy server provided by a mobile phone service carrier. In a specific embodiment, the server 102 includes web page 112 and transformation file analysis software 120. The server 102 may comprise a transformation file 118 communicated by the display device 104 as explained further below.

Figure 9:
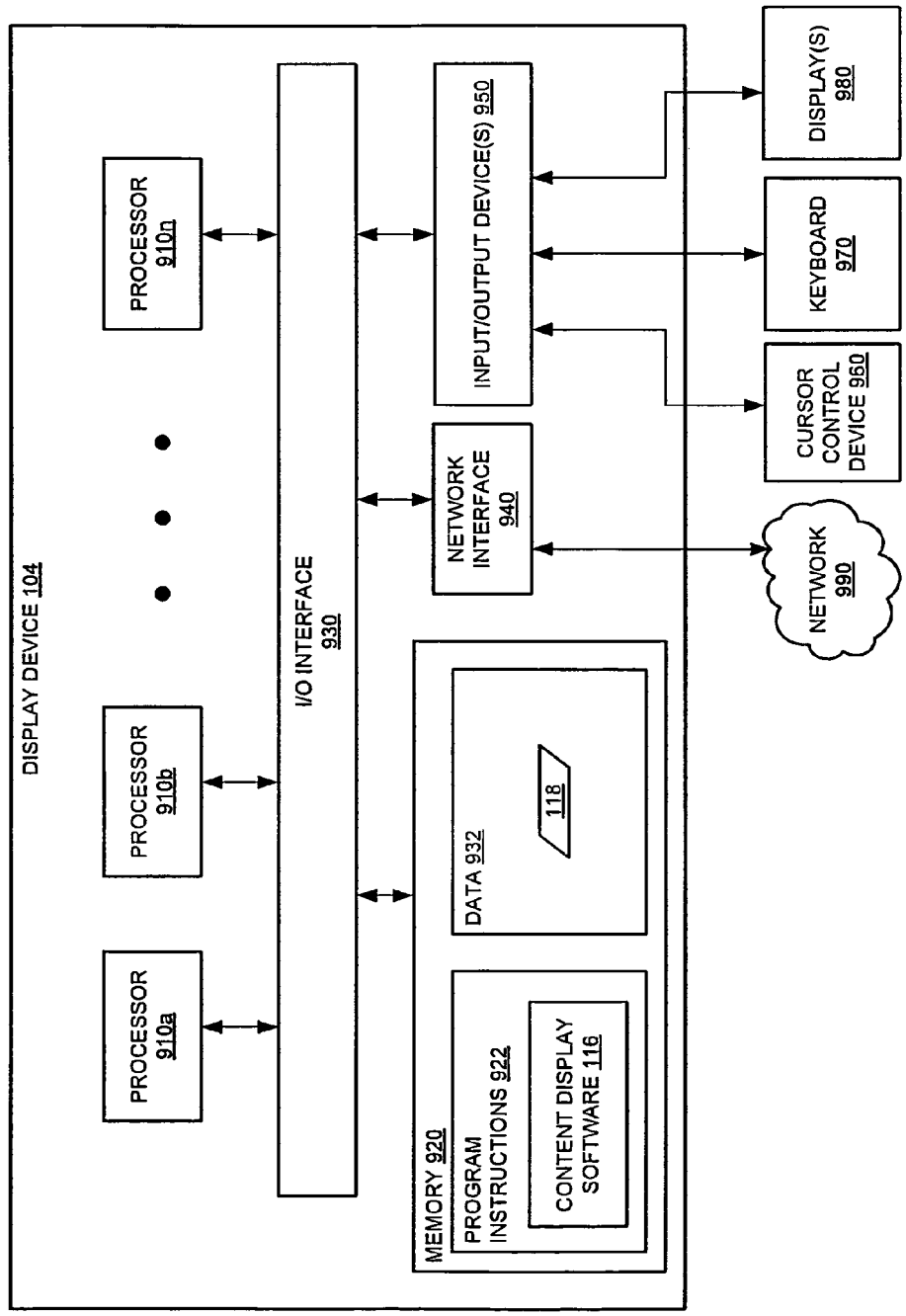
FIG. 9 is a block diagram of a display device, according to one or more embodiments.

The display device 104 is a type of a computing device (e.g., a mobile phone, a Personal Digital Assistant (PDA), hand-held gaming device, digital reading device, netbook, desktop computer, laptop computer and/or the like). FIG. 9 and its associated text describe details of the display device hardware. The display device 104 is utilized by a user to access various Internet resources (e.g., web pages, multimedia files (e.g., dynamic or static content in the form of images, video and/or audio), online services (e.g., social networking), applications, databases and/or the like). The display of such Internet resources on the display device 104 may be customized by the user as described in the present disclosure. The display device 104 includes a browser 110, content display software 116 and the transformation file 118.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or Intranet using various communications infrastructure such as Ethernet, WiFi, WiMax, General Packet Radio Service (GPRS), and the like.

The transformation server 108 is a type of computing device used for providing files and applications to other computers via a network. In one embodiment, the transformation server 108 may be third party service provider that provides web page content transformational services to one or more devices such as the display device 104. These services may be provided on a proxy server provided by a mobile phone services carrier. Such services may be provided in lieu of using the transformation file analysis software 120 and transformation file 118 on the web server 102. The transformation server 108 includes the transformation file 118 and the transformation file analysis software 120. The transformation server 108 may be utilized to perform statistical analysis on the transformation file(s) 118 and provide transformation services as described further below.

According to one embodiment, the web page 112 is defined by one or more files associated with a web site universal resource locator (URL). Such web pages 112 may be static or dynamic (e.g., a Hyper Text Markup Language (HTML) page, an eXtensible Markup Language (XML) page and/or the like). In one embodiment, the web page 112 includes or references content 114 for display or rendering. In one or more embodiments, the content 114 includes one or more objects 122 such as a multimedia display region for presenting audio, video, images, streaming multimedia and/or the like. More specifically, in one embodiment, the content 114 may include or reference content in a SWF file format (e.g., the SWF File Format Specification (Version 10) as published at by Adobe® Systems Incorporated of San Jose, Calif.) to be executed within a region on the web page. In this specific embodiment, the region in which the SWF file or other streaming multimedia file is rendered forms object 122.

According to various embodiments, the browser 110 (e.g., Internet Explorer® (IE), Mozilla® FireFox®, Google® Chrome™ and/or the like) includes software code that facilitates access to the various Internet resources such as the web page 112 and software such as add-ons or plug-ins that execute code and/or files to render content. As such, the user of the display device 104 may utilize the browser 110 to access the web pages 112 that includes the content 114 as explained further below.

Although the forgoing disclosure focuses upon display of web page content using a browser, it is contemplated that embodiments described herein may transform any rendered content, not only content rendered within a web page. Such content may be rendered using an application or widget executing on the display device, i.e., the content is rendered within the application or widget rather than an all-purpose browser. As such, the term web page, as used herein, is intended to include content rendered to a display using any form of rendering platform and/or software. Similarly, the term browser is intended to include applications, widgets and/or other software that render content for display.

According to one or more embodiments, the content display software 116 (e.g., Adobe® Flash® Player software) includes software code (e.g., processor executable instructions) configured to display content within the web page 112 on the display device 104. In one or more embodiments, the content display software 116 is further configured to enable the user to select one or more objects 122 (portions of the web page) from the content 114 and to provide an edit mode to allow a user to edit the position, rotation and/or scale of one or more selected objects 122. Once the user has manipulated the selected one or more objects 122, the content display software 116 enables the user to exit from the edit mode.

In one specific embodiment, the content display software 116 enables the user to manipulate the display of the one or more selected objects 122 such that the user may perform one or more transformations (e.g., scaling, resizing, rearranging, modifying, rotating and/or the like) on the one or more selected objects 122. Once the user has performed the transformations, the content display software 116 generates the transformation file 118 to reflect the transformations performed.

According to one or more embodiments, the transformation file 118 defines the one or more transformations performed by the user on the one or more selected objects 122. In one embodiment, the transformation file 118 includes one or more modified abscissa, ordinate, applicate, scaling factor, vector and/or the like. In one embodiment, the transformation file 118 further includes the display device type. For example, the transformation file 118 includes a model number, type of device (e.g., mobile phone, PDA, gaming device), size of the display screen, and/or the like. The transformation file 118 is communicated to the server 102 and/or the transformation server 108 for further analysis as explained further below.

The transformation file analysis software 120 includes software code (e.g., processor executable instructions) that is configured to process the transformation file 118. In one embodiment, the transformation file analysis software 120 may process the transformation file 118 to configure the content 114 within the web page 112 prior to subsequent communication of the web page 112 to the display device 104. Further, the transformation file analysis software 120 is configured to perform statistical analysis on the transformation file 118 to determine a number of users generating a similar transformation file 118 for a given web page. Once the determination is made that many users have similarly customized the web page 112, the server 102 may alter, prior to transmission to the display device 104, the web page 112 to include some or all of the content transformations defined by the transformation file 118.

In another embodiment, the server 102 performs a typical web server function, while the transformation server 108 provides the transformation file analysis function and performs the transformations as needed. Consequently, the display device 104 communicates a web page request to both the server 102 and the transformation server 108. In one embodiment, the web page content is provided to the display device 104 from the server 102 and the transformation server 108 provides a transformation file 118. The transformation file 118 is only sent if one is available for the requested web page and the user's particular type of display device. The display device 104 uses the transformation file to locally customize the display of the web page. In another embodiment, the transformation server 108, upon receiving the web page request for a web page having a transformation file applicable to the user's display device, may request the web page be redirected to the transformation server 108, where the transformation server 108 transforms the web page prior to delivery to the display device 104. In this manner, the web page is displayed as previously customized by the particular user or as suggested by a plurality of users via the transformation file analysis described below. The transformation function and analysis described below may be performed by either the server 102 or the transformation server 108.

Figure 2:
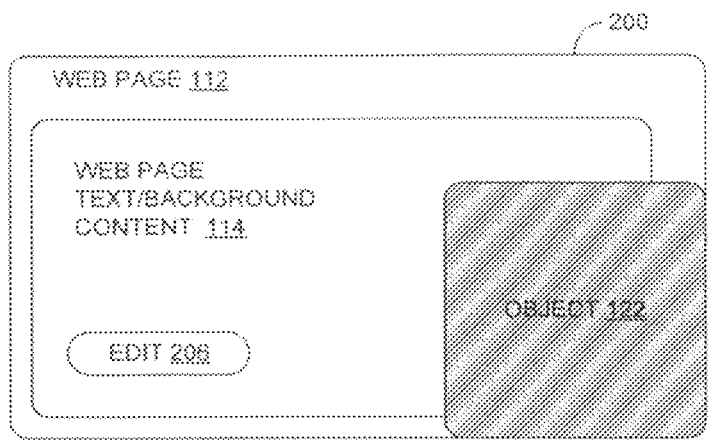
FIG. 2 illustrates a display screen containing a display of web page, according to one or more embodiments.

FIG. 2 illustrates a display screen 200 of a display device 104; display screen 200 depicts display of a web page 112 according to one or more embodiments. The display screen 200 is utilized for customizing content 114 of the web page 112. The display screen 200 may be a touch screen that accepts user input from a stylus or finger, and/or the like. Alternatively, the display screen 200 may accept the user input provided by a key pad, touch pad or other pointing/selection device.

In one embodiment, display device 104 executes content display software (e.g., the content display software 116 of FIG. 1) to display the web page 112 on the display screen 200. According to one or more embodiments, the web page 112 includes one or more files associated with a web site. Such web pages 112 may be static or dynamic in nature (e.g., a Hyper Text Markup Language (HTML) page, an eXtensible Markup Language (XML) page and/or the like and may include embedded content such as FLASH objects). In one embodiment, the web page 112 includes text and background content 114 as well as objects 122 such as a streaming multimedia display region (e.g., a SWF file).

In one embodiment, the web page 112 is rendered on the display screen 200 such that the content 114 is partially visible. Such partial visibility occurs because the web page 112 is larger than the screen size when the web page 112 is rendered in a standard format. To facilitate modifying the displayed content 114, the content display software provides an edit option 206 (e.g., a button, a pull down menu and/or the like) on the display screen 200. For example, FLASH Player software provides the edit option 206 upon a user selecting a context menu (for additional details see the description of FIG. 8 below). Once the edit option 206 is displayed on the display screen 200, the user may select the edit option 206 to enable modification (e.g., scaling, resizing, rearranging, modifying, rotating and/or the like) of the content 114 or portions thereof. In one embodiment, the selection of the edit option 206 enables the user to select an object 122 within the content 114 and customize the object's position, rotation and/or scale.

Figure 3:
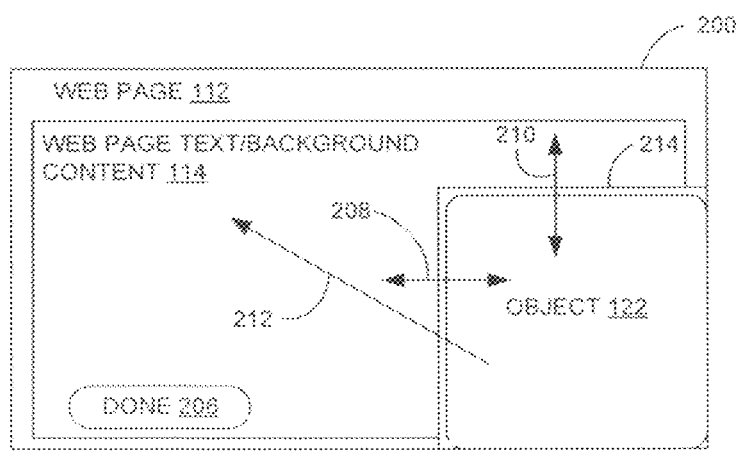
FIG. 3 illustrates a display screen containing a web page displayed in edit mode, according to one or more embodiments.

FIG. 3 illustrates a display screen 200 with the web page display in an edit mode in accordance with one embodiment. In one or more embodiments, the edit option enables a user to perform transformations on the content 114 of the web page 122. Upon entering the edit mode, rectangles appear around the active objects of the web page 112, for example, rectangle 214 around object 122. The user may select the objects 122 within the content 114 by providing input from a stylus, key pad, touch screen and/or the like. For example, the user may utilize a stylus to position cursor over edges (borders) of the rectangle 214. In some embodiments, any animation running on the web page is halted (frozen) while the web page is in edit mode.

Once an object 122 is selected, content display software (e.g., the content display software 116 of FIG. 1) generates one or more manipulation arrows 208, 210. Arrow 212 indicates that the object 122 can be dragged in its entirety to a new location within the web page 112. In one embodiment, the one or more manipulation arrows 208, 210 are associated with one or more of X axis or Y axis defining border movement. Such manipulation arrows 208, 210 may be selected by the user to perform transformation (e.g., scaling, resizing, rearranging, modifying and/or the like). For example, the user may modify location of the one or more selected objects 122 or independently move the sides of the object. As another example, the user may drag and resize the objects 112 to fit better on the display screen 200. To drag an object, the user may position a cursor near the center of the object, select, and move the cursor. In one or more embodiments, the user may perform the one or more transformations on the object 122 that modifies one or more of an abscissa, an ordinate, applicate, position vector, scaling factor and/or the like. Note that only the selected object 122 within the content 114 is modified, the web page text and/or background content 114 is unaffected by manipulation of the object 122.

The content display software creates a done option 206 while the user is using the edit mode. Once the user has customized the content 204 to a satisfactory degree, the user may select the "done" option or button 206 to exit the edit mode. If the animation had been halted, the animation is now restarted or resumed.

Figure 4:
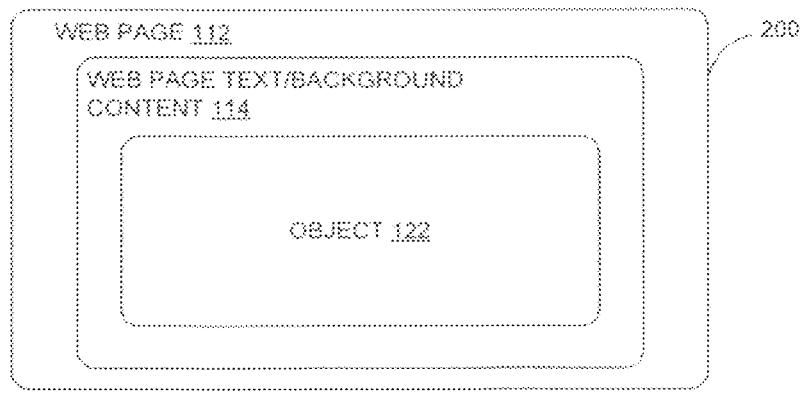
FIG. 4 illustrates a display screen containing a web page displayed subsequent to one or more transformations using edit mode, according to one or more embodiments.

FIG. 4 illustrates a display screen 200 containing the web page 112 subsequent to completion of one or more transformations. Specifically, the position of the object 122 has been customized by a user and the user has selected the "done" option 206. Consequently, the object 122 is displayed at the center of the display screen 200. Thus, the user may cause the object to be executed such that the content (e.g., images, text, streaming multimedia, and/or the like) is displayed in the centrally located object 122.

In one embodiment, the content display software is configured to save the one or more transformations performed by the user. The content display software generates a transformation file (e.g., the transformation file 118 of FIG. 1) containing transformation parameters defining the transformations that were performed e.g., ordinate, abscissa, applicate, scaling factor, position vector and the like). The transformation file may also contain a display device model identifier, screen size identifier and/or the like. The transformation file is stored in memory of the display device (e.g., the display device 104 of FIG. 1). Optionally, the transformation file may be communicated to a server (e.g., the server 102 of FIG. 1 and/or the transformation server 108 of FIG. 1) for further analysis. As described in detail below, if the web page is subsequently displayed at a later time, either the transformation file stored locally or a transformation file delivered from a server may be used to transform the content and automatically display the content in its transformed state.

In one embodiment, the transformation file comprises a transform matrix of values a, b, c, d tx and ty located in an XML file having the following form:

```
<transformations>
  <movieclip path="_root\video_mc">
    <transform a="2" b="0" c="0" d="2.5" tx="-70" ty="-70" />
  </movieclip>
  <movieclip path="_root\navMc">
    <transform a="0.5" b="0" c="0" d="0.5" tx="-100" ty="0" />
  </movieclip>
  <movieclip path="_root\enterBtn">
    <transform a="0.25" b="0" c="0" d="0.25" tx="-80" ty="10"/>
  </movieclip>
</transformations>
```

In an embodiment using a FLASH Player software, the player will apply the transformation matrix to an object ("movieclip") before rendering the object. In the above example, the component files of the SWF include video_mc, navMc, and enterBtn, which are identified by their instance name in a path from the root movieclip. The position of each movieclip component is transformed in accordance with the transform matrix values a, b, c, d tx and ty associated with each component. The specific value of each matrix variable defines pixel positioning relative to a particular screen size and resolution, i.e., the specific matrix values map pixels from one location in coordinate space to another location to facilitate object translation (repositioning), rotation, and scaling.

Figure 5:
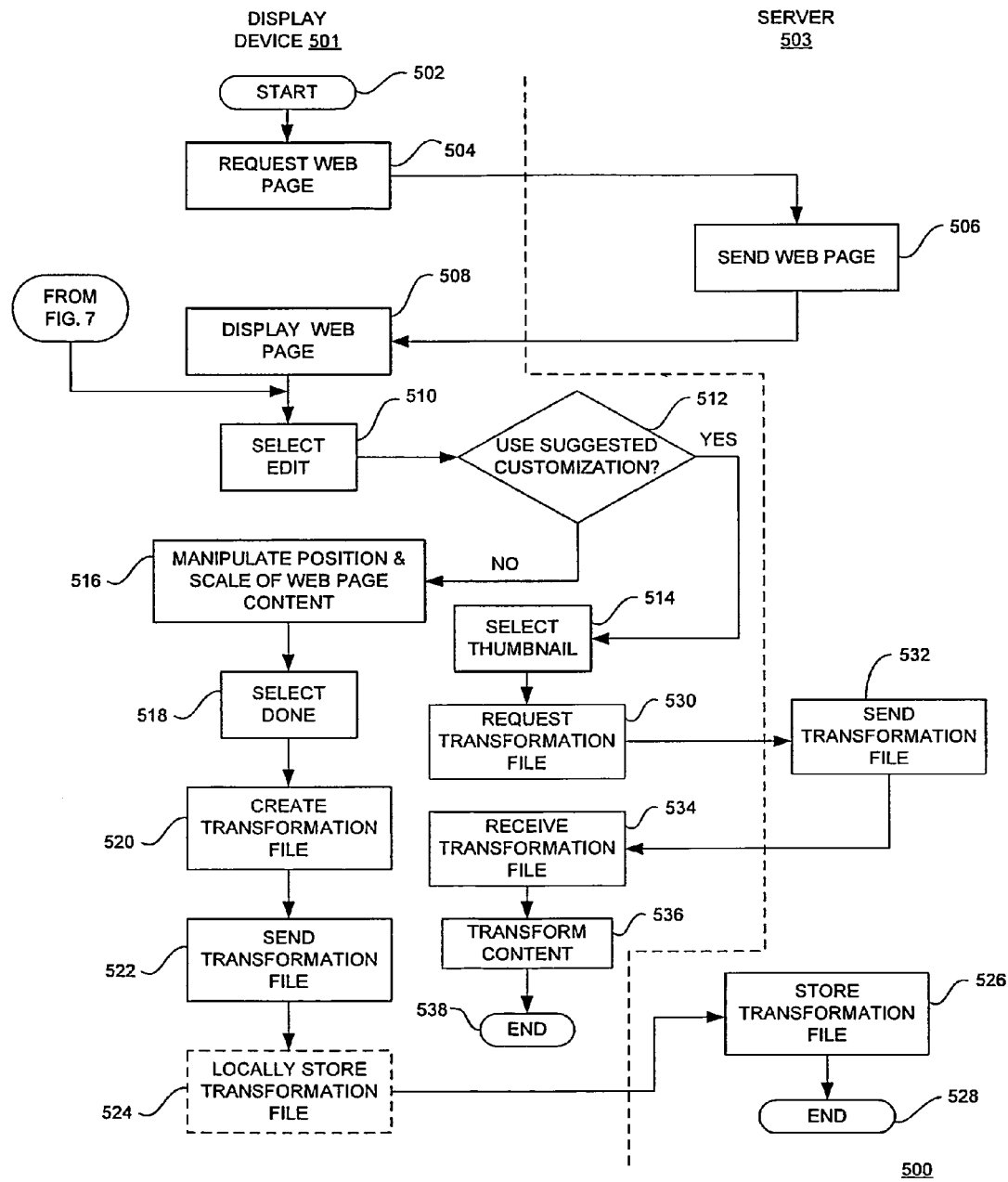
FIG. 5 is a flow diagram of a method for customizing content from a web page on a display device, according to one or more embodiments.

FIG. 5 is a flow diagram of a method 500 of customizing a web page on a display device according to various embodiments. For clarity, operations performed by the display device (e.g., display device 104 in FIG. 1) are listed under display device 501 and operations performed by the server (e.g., server 102 in FIG. 1) are listed under server 503. The method 500 starts at step 502 and proceeds to step 504, at which a web page is requested by the display device. In one embodiment, a user of a display device (e.g., the display device 104 of FIG. 1) requests the web page. At step 506, the requested web page is communicated from the server. In one embodiment, a server (e.g., the server 102 of FIG. 1) processes the request and communicates the requested web page. At step 508, the web page is displayed on the display device screen. The web page may include content that can be customized in accordance with various embodiments. Such content may include streaming multimedia display region (e.g., SWF files). At step 510, an edit option is selected and the method 500 receives the selection to place the selected object into edit mode. In one or more embodiments, the user of the display device utilized the content display software (e.g., the content display software 116 of FIG. 1) to select an edit option to modify the content. Other pre-created layout options may be offered as described below.

At step 512, the method 500 queries the user with regard to using a suggested customization. For example, one or more thumbnails may be provisioned on the display device. The thumbnails depict the web page in one or more customized views as described below with respect to FIG. 8. In lieu of thumbnails, a menu list or other selectable display of possible customizations may be displayed. The process used to create the suggested customization is described with respect to FIG. 6 below. If the user utilizes a suggested customization (option "YES"), then the method 500 proceeds to step 514. At step 514, one or more of the suggestions are selected. In one embodiment, the user of the display device selects a thumbnail. Once the thumbnail is selected, the method 500 proceeds to step 530. At step 530, the method 500 requests a transformation file corresponding to the selected thumbnail from the server. At step 532, the server responds with the transformation file, which is received by the display device at step 534. The method 500 uses the transformation file, at step 536, to transform the display. At step 538, the method 500 ends.

If at step 512, the user does not utilize a suggested customization, then the method 500 proceeds to step 516. At step 516, the user manipulates the orientation (e.g., position, scale, rotation and the like) of the web page content. As such, the transformation results in modification of position, rotation and/or scale of the selected content. Once the selected content is modified, the method 500 proceeds to step 518.

At step 518, the user selects a done option to indicate an end to the editing session. The method 500 proceeds to step 520 where a transformation file (e.g., the transformation file 118 of FIG. 1) is created. The transformation file is created in accordance with the one or more transformations performed by the user on the content. In one or more embodiments, the transformation file includes parameters defining changes to one or more of an abscissa, an ordinate, an applicate, position vector and/or scaling factor. At step 522, the transformation file is communicated to the server. In an alternative embodiment, the transformation file is communicated to a transformation server (e.g., the transformation server 108 of FIG. 1).

Optionally, at step 524, the transformation file is locally stored in the local file system on the display device such that subsequent provisioning of the web page is performed in accordance with the transformation file, i.e., the transformation file is utilized to perform (i.e., replay) the transformation on the subsequent provisioning of the web page. At step 526, server and/or the transformation server stores the transformation file for further analysis. In one embodiment, the user may be queried whether the transformation file is to be shared and uploaded to the server or only stored locally. The user may also volunteer personal information attributing the transformation file to the user. The method 500 proceeds to step 528, at which the method 500 ends.

Figure 6:
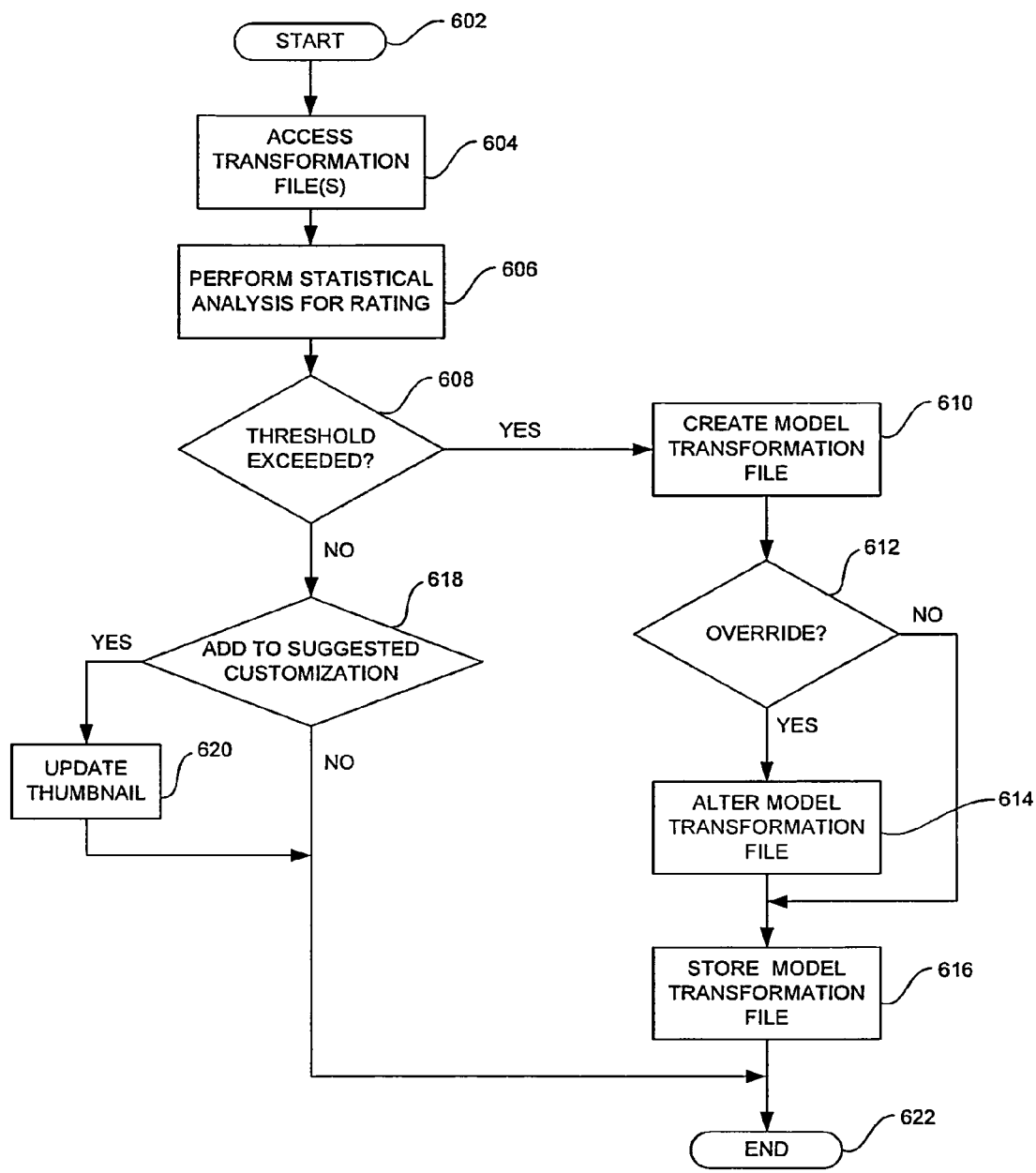
FIG. 6 is a flow diagram of a method for performing statistical analysis upon a transformation file, according to one or more embodiments.

FIG. 6 is a flow diagram of a method 600 for performing statistical analysis upon a transformation file according to one embodiment. In one embodiment, transformation file analysis software (e.g., the transformation file analysis software 120 of FIG. 1) is executed by one or more processors, configured to perform statistical analysis on one or more transformation files (e.g., the transformation file 118 of FIG. 1).

The method 600 starts at step 602 and proceeds to step 604, where the one or more transformation file(s) are accessed. In one embodiment, the one or more transformation files are associated with one or more display device type (i.e., models, or other indicators of screen size and resolution). This device information is typically contained in the transformation file. At step 606, statistical analysis for rating the transformations is performed. The statistical analysis is performed to associate a rating with the transformation files. The analysis determines the number of users (a count) that have transformed a given web page on a given type of display device in a substantially similar manner, i.e., a collaborative, communal decision with regard to a "best" transformation for a given web page and given display device. For example, two transformation files may be deemed substantially similar if the scaling, rotation and position parameters are within a defined percentage of one another.

At step 608, the method 600 queries whether the count exceeds a threshold. If is the method 600 determines that the count has exceeded the threshold, then the method 600 proceeds to step 610. In one embodiment, the count exceeding the threshold value indicates that a significant number of users generated a similar transformation file for a given web page using a particular type of display device. At step 610, a model transformation file is created to define a suggested customization. The model transformation file represents transformation information from a plurality of transformation files used by a community of display device users. Through the statistical analysis, the model transformation file becomes a socially generated file representing a transformation that a given user will most likely desire to use on their display device for a given web page. In one embodiment, the model transformation file is utilized to provision a thumbnail on the display device as a suggested customization. If multiple customizations exceed the count threshold, then multiple thumbnails may be created.

At step 612, the method 600 queries whether an owner or administrator of the web page has created an override for the model transformation files. In one embodiment, the owner or administrator of the web page may override the model transformation file to accommodate display of advertisements or other branding provided by advertisers or the web page owner. i.e., the web page owner or administrator may block or modify a customization that, for example, obscures an advertiser's display or covers the web page owner's brand. If it is determined that the owner or administrator of the web page has placed an override on the model transformation files (option "YES"), the method 600 proceeds to step 614. At step 614, the owner or administrator of the web page manually or automatically alters the model transformation file. The alteration may include deletion of the transformation file such that no transformations are permitted.

If, at step 612, the method 600 determines that the owner of the web page does not override the model transformation files (option "NO"), then the method 600 proceeds to step 616. At step 616, the model transformation file is stored in memory of the server and/or transformation server. The method 600 proceeds to step 622.

If, at step 608, the method 600 determines that the count does not exceed the threshold (option "NO"), then the method 600 proceeds to step 618. At step 618, the method 600 determines whether the one or more transformation files are to be added to a suggested customization list based on criteria other than the count or in addition to the count. If the method 600 determines that the one or more transformation files are to be added to the suggested customization (option "YES"), the method 600 proceeds to step 620. At step 620, the thumbnails and/or menu entries are updated as suggested customization for the given web page and the method proceeds to step 622.

If at step 618, the method 600 determines that the one or more transformation files are not to be added to the suggested customization list (option "NO"), then the method 600 proceeds to step 622. At step 622, the method 600 ends.

In an embodiment where the transformation is applied to a SWF file, the model transformation file produced through collaboration may contain the SWF URL, the md5 code of the SWF file, and the display device screen size information. For example, a transformation of a movie clip at the Disney.go.com web page may have the following form:

```
<SWFTransformation>
    <SWFURL
md5="2901923901092132">http://disney.go.com/disneypictures/up/
splash.swf</SWFURL>
    <deviceinfo>
        <screeninfo height="320" width="240" />
    </deviceinfo>
    <transformations>
        <movieclip path="_root\video_mc">
            <transform a="2" b="0" c="0" d="2.5" tx="-70" ty="-70" />
        </movieclip>
        <movieclip path="_root\navMc">
            <transform a="0.5" b="0" c="0" d="0.5" tx="-100" ty="0" />
        </movieclip>
        <movieclip path="_root\enterBtn">
            <transform a="0.25" b="0" c="0" d="0.25" tx="-80" ty="10" />
        </movieclip>
    </transformations>
</SWFTransformation>
```

In this example, the transformation file comprising XML code identifies a specific SWF file within the webpage using an md5 code, e.g., 2901923901092132. The various components of the SWF file include video_mc, navMc, and enterBtn that are transformed in accordance with the transform matrix values. The coordinate space for the transformation file is defined by the device information parameter, e.g., <deviceinfo>. In this example, the device information comprises a screen height of 320 pixels and a screen width of 240 pixels. Consequently, this particular model transformation file might be sent to display devices having this particular screen size. The model transformation file may be shared with many users, as described below to enhance their viewing experience.

Figure 7:
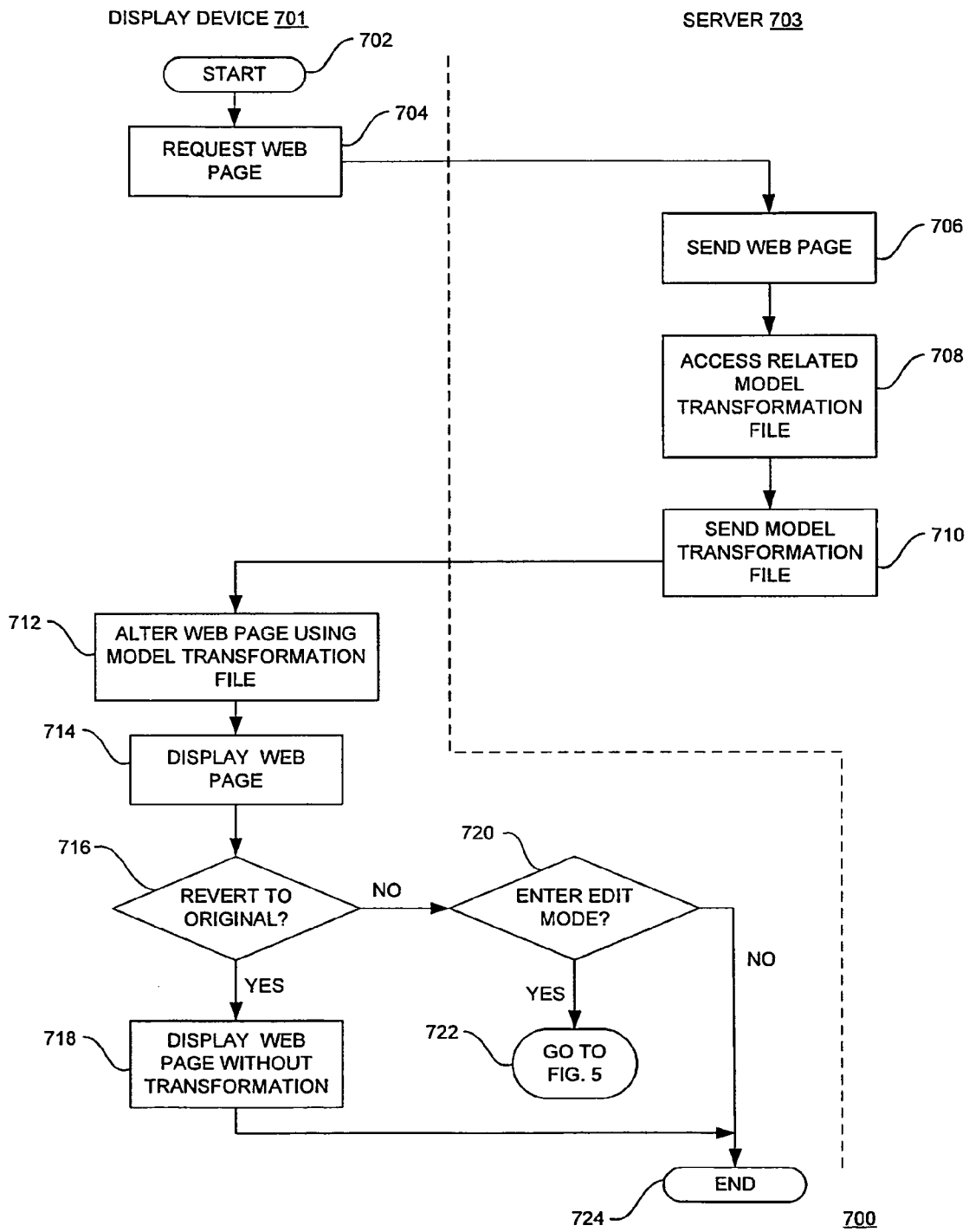
FIG. 7 is a flow diagram of a method for displaying a web page on a display device, according to one or more embodiments.

FIG. 7 is a flow diagram of a method 700 for displaying a web page on a display device according to one embodiment where a model transformation file has previously been created. The method 700 comprises operations performed by the display device (labeled display device 701 as performed by, for example, display device 104 in FIG. 1) and operations performed by the server (labeled server 703 as performed by, for example server 102 or 108 of FIG. 1). The method 700 starts at step 702 and proceeds to step 704, where a web page is requested by the display device. In one embodiment, a user of a display device (e.g., the display device 104 of FIG. 1) requests the web page. At step 706, the web page is communicated from a server to the display device. In one embodiment, a server (e.g., the server 102 of FIG. 1) communicates the requested web page. At step 708, related model transformation file is accessed. In one embodiment, the server accesses the model transformation file associated with the display device and the web page. At step 710, the server communicates the model transformation file to the display device.

The foregoing description assumes the web page and its associated model transformation file are being sent from the web server (server 102 in FIG. 1). In an alternative embodiment, the web page may be provisioned by a web server and the transformation file may be provisioned from the transformation server (server 108 in FIG. 1). In such an embodiment, the display device communicates with the transformation server to request transformation files. In a further embodiment, the display device sends the web page request to the transformation server. The transformation server requests the web page from the web server. The transformation server sends the web page and the transformation files(s) to the display device. In an alternative embodiment, the user may specify in a preference file for the content display software that a particular website be searched for transformation files each time a web page is being loaded with content that is transformable. The appropriate transformation file will automatically be sent from the transformation server for the web page being rendered.

At step 712, upon receiving the model transformation file, the web page is automatically altered utilizing the model transformation file and, at step 714, displayed on the display device. In an alternative embodiment, the display device may utilize a locally stored transformation file corresponding to the web page rather than use the model transformation file to define the transformation of the web page. Thus, the locally stored transformation file is received from memory and used as the model transformation file. In another alternative embodiment, the server (e.g., server 102 or 108 of FIG. 1) may transform the webpage using the model transformation file and/or its contents and send a transformed webpage to the display device (e.g., display device 104 of FIG. 1). As such, step 712 may alternatively be performed on the server 703 portion of FIG. 7. The model transformation file may or may not accompany the transmission of the transformed web page to the display device.

At step 716, the method 700 determines whether the user wants to revert back to the original web page (i.e., not view the modified web page). If the method 700 determines that the user wants to revert back to the original web page (option "YES"), then the method 700 proceeds to step 718. At step 718, the web page is displayed without transformation. Such a display may require re-requesting the web page from the web server. In this embodiment, the user does not desire to customize the web page in accordance with the model transformation file. The method 700 proceeds to step 724.

If, at step 716 the method 700 determines that the user does not want to revert back to the original web page (option "NO"), then the method 700 proceeds to step 720. At step 720, the method 700 queries whether the user wants to enter into an edit mode, i.e., the user selects edit mode from a context menu (see FIG. 8) or an edit mode button (see FIG. 2).

If the method 700 determines that the user wants to enter into the edit mode (option "YES"), then the method 700 proceeds to step 722. At step 722, the method proceeds to step 510 of method 500. As described above with respect to FIG. 5, upon entering method 500 from step 722, the user may utilize the edit mode to customize the web page.

If, at step 720, the method 700 determines that the user does not want to enter into the edit mode, then the method 700 proceeds to step 724, where the method 700 ends and the web page remains displayed as defined by the model transformation file.

Figure 8:
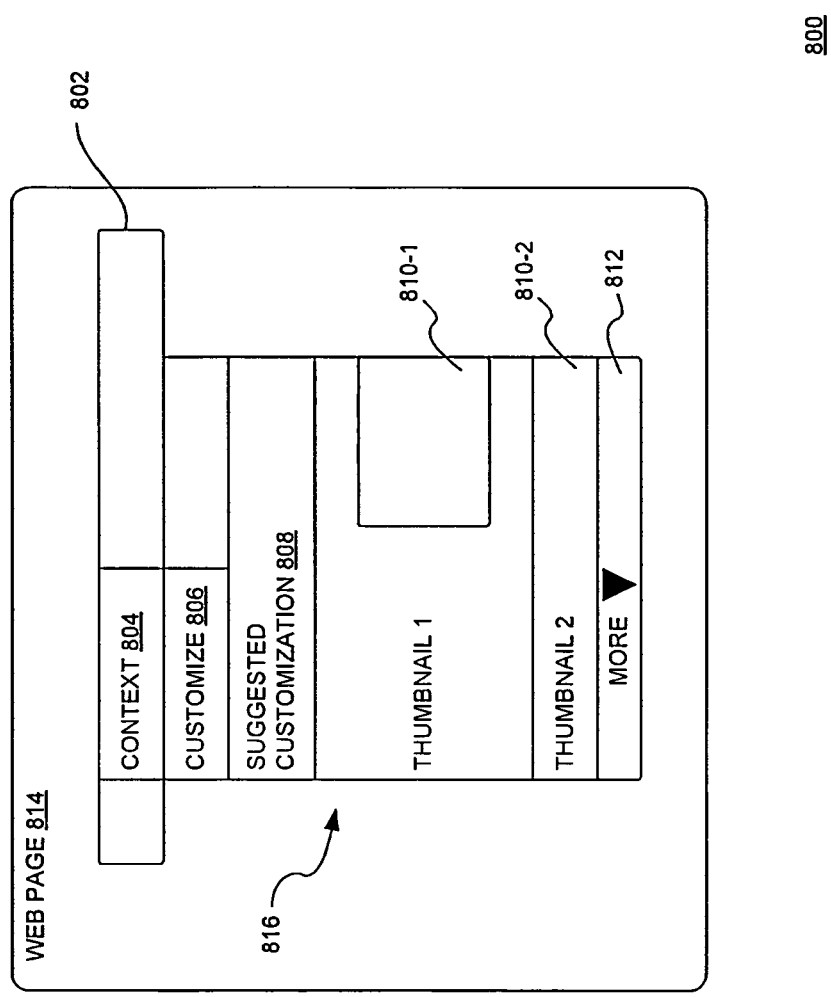
FIG. 8 illustrates a display that depicts provisioning of one or more suggested customization thumbnails.

FIG. 8 illustrates a display screen 800 that depicts provisioning of one or more suggested customizations according to one or more embodiments. The display screen 800 is similar to the display screen 200 of FIG. 2. As already discussed, content display software (e.g., the content display software 116 of FIG. 1) is configured to render a web page 814 (e.g., the web page 112 of FIG. 1) on the display screen 800. When the user places, depending on the type of display screen, a cursor, pointer or finger over the margin of the web page, the content display software overlays a menu bar 802 atop the web page 814. The menu bar 802 comprises one or more menu options. In one embodiment, the menu bar 802 includes context menu option 804.

According to one or more embodiments, the context menu option 804 is configured to provision a pull down menu 816 that includes customize option 806, suggested customizations 808 that include thumbnails 810, and a "more" selection 812. In one or more embodiments, a user may select one of these options. For example, the user may select the customize option 806 that results in provisioning the content in the edit mode (i.e., the customize option 806 may be used in lieu of, or in addition to, an edit button). In another embodiment, the user may select the suggested customization 808. The suggested customization 808 includes one or more thumbnail 810 (illustrated as a thumbnail 810-1, a thumbnail 810-2) that appear beneath the suggested customization selection field when the field is selected. According to various embodiments described previously, the one or more thumbnails 810 are provisioned based on a statistical analysis performed by transformation file analysis software (e.g., the transformation file analysis software 120 of FIG. 1) on one or more transformation files. In one embodiment, a thumbnail is a graphically representation of a model transformation file applied to a given web page.

Once a thumbnail 810 is selected, the transformations are performed on the content in accordance with the associated transformation file such that the content is displayed accordingly. According to various embodiments, the "more" selection 812 includes one or more thumbnails that are not yet shown on the display 800. Upon selecting the "more" selection 812, the additional thumbnails are displayed. Upon selection of one of the additional thumbnails, the web page display is altered to match the thumbnail. In lieu of thumbnails, the context menu may have a list of suggested customization description.

Example Display Device

Various embodiments of a system and method for customizing a web page for display on a display device, as described herein, may be executed on one or more display devices, which may interact with various other devices. One such display device is display device 104 illustrated by FIG. 9 (e.g., display device 104 of FIG. 1), which may in various embodiments implement any of the elements or functionality illustrated in FIGS. 1-8. In various embodiments, display device 104 may be configured to implement content display software 116 described above. While the illustrated system demonstrates display device 104 implementing content display software 116, display device 104 may be used to implement any other system, device, element, functionality or method of the above-described embodiments. In the illustrated embodiments, display device 104 may be configured to implement content display software as processor-executable executable program instructions 922 (e.g., program instructions executable by processor(s) 910) in various embodiments.

In the illustrated embodiment, display device 104 includes one or more processors 910 (individually shown as 910a, 910b . . . 910n) coupled to a device memory 920 via an input/output (I/O) interface 930. Display device 104 may further includes a network interface 940 coupled to I/O interface 930, and one or more input/output devices 950, such as cursor control device 960, keyboard 970, and display(s) 980. In various embodiments, any of components 960-980 may be utilized by the content display software 116 to receive user input. In various embodiments, a user interface may be generated and displayed on display 980. In some cases, it is contemplated that embodiments may be implemented using a single instance of display device 104, while in other embodiments multiple such devices make up display device 104, may be configured to host different portions or instances of various embodiments. For example, in one embodiment some elements may be implemented via one or more devices of display device 104 that are distinct from those devices implementing other elements. In another example, multiple devices may implement display device 104 in a distributed manner.

In different embodiments, display device 104 may be any of various types of devices where web page customization would be useful, including, but not limited to, a mobile phone, a Personal Digital Assistant (PDA), laptop, notebook, or netbook computer, handheld computer, a camera, a set top box, a consumer device, video game console, handheld video game device, digital or in general any type of computing or electronic device having a display screen of limited size and/or a processor of limited computing capability.

In various embodiments, display device 104 may be a uniprocessor device including one processor 910, or a multiprocessor device including several processors 910a, 910b . . . 910n (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC®, SPARC, or MIPS ISAs, or any other suitable ISA. In multiprocessor systems, each of processors 910 may commonly, but not necessarily, implement the same ISA.

Device memory 920 may be configured to store program instructions 922 (e.g., content display software 116) and/or data 932 (e.g., transformation files 118) accessible by processor 910. In various embodiments, device memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within device memory 920. In other embodiments, program instructions and/or data may be received, sent or stored upon different types of computer-accessible media or on similar media separate from device memory 920 or display device 104.

In one embodiment, I/O interface 930 may be configured to coordinate I/O traffic between processor 910, device memory 920, and any peripheral devices in the device, including network interface 940 or other peripheral interfaces, such as input/output devices 950, In some embodiments, I/O interface 930 may perform any necessary protocol, timing or other data transformations to convert data signals from one components (e.g., device memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to device memory 920, may be incorporated directly into processor 910.

Network interface 940 may be configured to allow data to be exchanged between display device 104 and other devices attached to a network (e.g., network 990), such as one or more external devices or between display device 104. In various embodiments, network 990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more display device 104. Multiple input/output devices 950 may be present in display device 104. In some embodiments, similar input/output devices may be separate from display device 104 and may interact with one or more display devices 104 through a wired or wireless connection, such as over network interface 940.

In some embodiments, the illustrated display device may implement any of the methods described above, such as the methods illustrated by the flowcharts of FIGS. 5-7. In other embodiments, different elements and data may be included.

Those skilled in the art will appreciate that display device 104 is merely illustrative and is not intended to limit the scope of embodiments. In particular, the display device and devices may include any combination of hardware or software that can perform the indicated functions of various embodiments, including computers, network devices, Internet appliances, PDAs, wireless phones, pagers, etc. Display device 104 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated display device via inter-computer communication. Some or all of the device components or data structures may also be stored (e.g., as instructions or structured data) on a computer-accessible medium or a portable article to be read by an appropriate drive, various examples of which are described above. In some embodiments, instructions stored on a computer-accessible medium separate from display device 104 may be transmitted to display device 104 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

Example Server or Transformation Server

Various embodiments of a computer server used in a system for customizing a web page for display on a display device, as described herein, may be executed on one or more computer systems, which may interact with various other devices. One such computer system is computer system 1000 illustrated by FIG. 10, which may in various embodiments implement any of the elements or functionality illustrated in FIGS. 1-9 regarding the server 102 or the transformation server 108. In various embodiments, computer system 1000 may be configured to implement the transformation file analysis software 120 described above. While the illustrated system demonstrates computer system 1000 implementing the transformation file analysis software 120, computer system 1000 may be used to implement any other system, device, element, functionality or method of the above-described embodiments. In the illustrated embodiments, computer system 1000 may be configured to implement the transformation file analysis software 120 as processor-executable executable program instructions 1022 (e.g., program instructions executable by processor(s) 1010) in various embodiments.

In the illustrated embodiment, computer system 1000 includes one or more processors 1010 (individually shown as 1010a, 1010b, 1010n) coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In various embodiments, any of components 1060-1080 may be utilized by the transformation file analysis software 120 to receive user input. In various embodiments, a user interface may be generated and displayed on display 1080. In some cases, it is contemplated that embodiments may be implemented using a single instance of computer system 1000, while in other embodiments multiple such systems, or multiple nodes making up computer system 1000, may be configured to host different portions or instances of various embodiments. For example, in one embodiment some elements may be implemented via one or more nodes of computer system 1000 that are distinct from those nodes implementing other elements. In another example, multiple nodes may implement computer system 1000 in a distributed manner.

In different embodiments, computer system 1000 may be any of various types of devices, including, but not limited to, one or more of a personal computer system, desktop computer, laptop, notebook, or netbook computer, mainframe computer system, handheld computer, workstation, network computer, application server, storage device, a peripheral device such as a switch, modem, router, or in general any type of computing or electronic device.

In various embodiments, computer system 1000 may be a uniprocessor system including one processor 1010, or a multiprocessor system including several processors 1010a, 1010b, 1010n (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC®, SPARC, or MIPS ISAs, or any other suitable ISA. In multiprocessor systems, each of processors 1010 may commonly, but not necessarily, implement the same ISA.

System memory 1020 may be configured to store program instructions 1022 (e.g., transformation file analysis software 120) and/or data 1032 (e.g., one or more transformation files 118) accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1020. In other embodiments, program instructions and/or data may be received, sent or stored upon different types of computer-accessible media or on similar media separate from system memory 1020 or computer system 1000.

In one embodiment, I/O interface 1030 may be configured to coordinate I/O traffic between processor 1010, system memory 1020, and any peripheral devices in the device, including network interface 1040 or other peripheral interfaces, such as input/output devices 1050, In some embodiments, I/O interface 1030 may perform any necessary protocol, timing or other data transformations to convert data signals from one components (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 1090), such as one or more external systems or between nodes of computer system 1000. In various embodiments, network 1090 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

In some embodiments, the illustrated computer system may implement any of the methods described above, such as the methods illustrated by the flowcharts of FIGS. 5-7. In other embodiments, different elements and data may be included.

Those skilled in the art will appreciate that computer system 1000 is merely illustrative and is not intended to limit the scope of embodiments. In particular, the computer system and devices may include any combination of hardware or software that can perform the indicated functions of various embodiments, including computers, network devices, Internet appliances; etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for customizing content displayed on a display device of a display type comprising:
  receiving a web page comprising content for display upon the display device;
  receiving a first transformation file comprising information associated with transforming a streaming multimedia display region within the web page with regard to at least one of position, scale or rotation, wherein the first transformation file comprises instructions indicating how to position, scale, or rotate the streaming multimedia display region relative to pixels of a screen of the display device having a particular size and resolution;
  transforming, based upon the information in the first transformation file, the streaming multimedia display region with regard to at least one of position, scale or rotation with respect to the pixels of the screen of the display device, while not transforming portions of the web page other than the streaming multimedia display region; and
  displaying the web page having the streaming multimedia display region transformed in accordance with the first transformation file.

2. The computer implemented method of claim 1, wherein the display device is a mobile device.

3. The computer implemented method of claim 1 further comprising playing a movie clip within the transformed streaming multimedia display region that is sized to fit the transformed streaming multimedia display region.

4. The computer implemented method of claim 1, further comprising receiving the first transformation file from at least one of a server or local memory.

5. The computer implemented method of claim 1, further comprising:
  receiving a selection of the streaming multimedia display region;
  detecting user input for transforming the streaming multimedia display region;
  transforming the streaming multimedia display region with regard to at least one of position, scale or rotation in accordance with the detected user input, while not transforming the portions of the web page other than the streaming multimedia display region; and generating a second transformation file based on the transformation of the streaming multimedia display region in accordance with the detected user input.

6. The computer implemented method of claim 5, further comprising communicating the second transformation file to at least one of a transformation server or memory of the display device.

7. The computer implemented method of claim 5, wherein receiving a selection further comprises executing an edit mode to enable transforming the object.

8. The computer implemented method of claim 1, wherein the first transformation file is a model transformation file, where the model transformation file comprises transformation information representing information from a plurality of transformation files.

9. The computer implemented method of claim 8, further comprising using the model transformation file for controlling subsequent display of the web page on the display device.

10. The computer implemented method of claim 1, further comprising:
displaying a thumbnail of the web page transformed in accordance with the first transformation file;
detecting a user selection of the thumbnail; and
transforming the streaming multimedia display region in response to the user selection of the thumbnail.

11. A system for customizing a web page for display based on a type of display device comprising:
at least one server including instructions thereon that, when executed by the at least one server, cause the system to:
receive transformation files from a plurality of display devices, where each transformation file comprises information associated with transforming a streaming multimedia display region of a web page with regard to at least one of position, scale or rotation relative to pixels of a screen of a display device that sent the transformation file, while not transforming portions of the web page other than the streaming multimedia display region,
identify the transformation files received from display devices having a screen of a particular size and resolution;
analyze the transformation files received from the display devices having the screen of the particular size and resolution to identify one or more subsets of transformation files that position, scale, or rotate the streaming multimedia display region relative to the pixels of the screen of the particular size and resolution within a predefined percentage of one another;
identify a subset of the transformation files that includes a number of the transformation files that position, scale, or rotate the streaming multimedia display region relative to the pixels of the screen of the particular size and resolution within the predefined percentage of one another, that exceeds a predetermined threshold; and
process the subset of transformation files to derive a model transformation file for display devices having the particular size and resolution based on how the subset of transformation files position, scale, or rotate the streaming multimedia display region relative to the pixels of the screen of the particular size and resolution.

12. The system of claim 11, wherein the instructions, when executed by the at least one server, further cause the system to generate a thumbnail for display on display devices having the screen of the particular size and resolution, where the thumbnail comprises a graphical representation of the web page including the streaming multimedia display region organized in accordance with the model transformation file.

13. The system of claim 12, wherein the instructions, when executed by the at least one server, further cause the system to send the model transformation file and the thumbnail to display devices having the screen of the particular size and resolution in response to a request for the web page.

14. The system of claim 11, wherein the instructions, when executed by the at least one server, further cause the system to modify the web page in accordance with the model transformation file and send the modified web page to display devices having the screen of the particular size and resolution in response to a request for the web page.

15. The system of claim 11, wherein the instructions, when executed by the at least one server, further cause the system to rank the one or more subsets of transformation files that position, scale, or rotate the streaming multimedia display region relative to the pixels of the screen of the particular size and resolution within the predefined percentage of one another based on the number of transformation files in each subset.

16. The system of claim 15, wherein the instructions, when executed by the at least one server, further cause the system to disable use of the model transformation file in response to an override instruction from an administrator of the web page.

17. A non-transitory computer readable medium comprising one or more processor executable instructions that, when executed by at least one processor, causes a display device to perform a method comprising:
receiving a web page comprising content for display upon the display device;
receiving a first transformation file comprising information associated with transforming a streaming multimedia display region within the web page with regard to at least one of position, scale or rotation, wherein the first transformation file comprises instructions indicating how to position, scale, or rotate the streaming multimedia display region relative to pixels of a screen of the display device;
transforming, based upon the information in the first transformation file, the streaming multimedia display region with regard to at least one of position, scale or rotation with respect to the screen of the display devices, while not transforming portions of the web page other than the streaming multimedia display region; and
displaying the web page having the streaming multimedia display region transformed in accordance with the first transformation file.

18. The computer readable medium of claim 17, comprising one or more processor executable instructions that, when executed by at least one processor, causes the display device to further perform steps comprising:
receiving a selection of the streaming multimedia display region;
detecting user input for transforming the streaming multimedia display region;
transforming the streaming multimedia display region with regard to at least one of position, scale or rotation in accordance with the detected user input, while not transforming the portions of the web page other than the streaming multimedia display region; and
generating a second transformation file based on the transformation of the streaming multimedia display region in accordance with the detected user input.

19. The computer readable medium of claim 18, comprising one or more processor executable instructions that, when executed by at least one processor, causes the display device to further perform steps comprising:

communicating the second transformation file to at least one of a transformation server or memory of the display device.

20. The computer readable medium of claim 17, comprising one or more processor executable instructions that, when executed by at least one processor, causes the display device to further perform steps comprising:
   playing a movie clip within the transformed streaming multimedia display region that is sized to fit the transformed streaming multimedia display region.

* * * * *